United States Patent [19]

Tower

[11] Patent Number: 5,168,460

[45] Date of Patent: Dec. 1, 1992

[54] SYSTOLIC FFT ENGINE WITH INTERMEDIATE HIGH SPEED SERIAL INPUT/OUTPUT

[75] Inventor: Lee W. Tower, Rancho Palos Verdes, Calif.

[73] Assignee: Hughes Aircraft Company, Los Angeles, Calif.

[21] Appl. No.: 621,487

[22] Filed: Nov. 30, 1990

[51] Int. Cl.⁵ .......................................... G06F 15/332
[52] U.S. Cl. .................................................. 364/726
[58] Field of Search .............................. 364/725–726

[56] References Cited

U.S. PATENT DOCUMENTS

| | | | |
|---|---|---|---|
| 4,601,006 | 7/1986 | Liu | 364/726 |
| 4,821,224 | 4/1989 | Liu et al. | 364/726 |
| 4,868,776 | 9/1989 | Gray et al. | 364/726 |
| 5,010,511 | 4/1991 | Hartley et al. | 364/786 |
| 5,034,910 | 7/1991 | Whelchel et al. | 364/726 |

Primary Examiner—Tan V. Mai
Attorney, Agent, or Firm—Leonard A. Alkov; W. K. Denson-Low

[57] ABSTRACT

A dense modular system for the high speed computation of a composite fast Fourier transform (FFT) is disclosed. The composite FFT is formed by aggregating a series of individual FFT passes. The FFT passes are calculated within module boundaries in a substantially parallel manner and the input and output between the modules is transmitted in a substantially serial manner. The serial transmission takes place at a higher speed than the parallel FFT computation in order to preserve the constant data flow in the composite FFT.

8 Claims, 7 Drawing Sheets

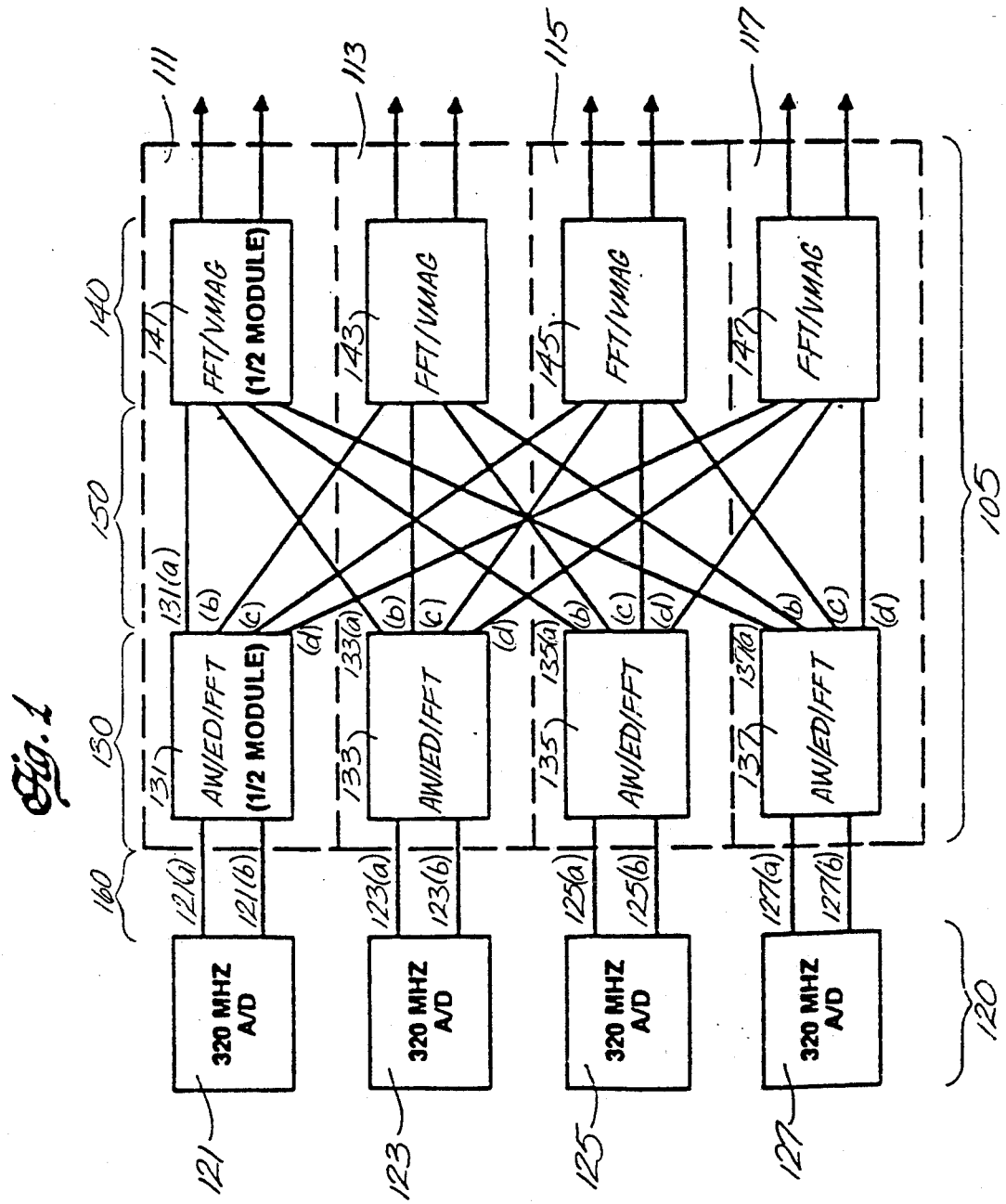

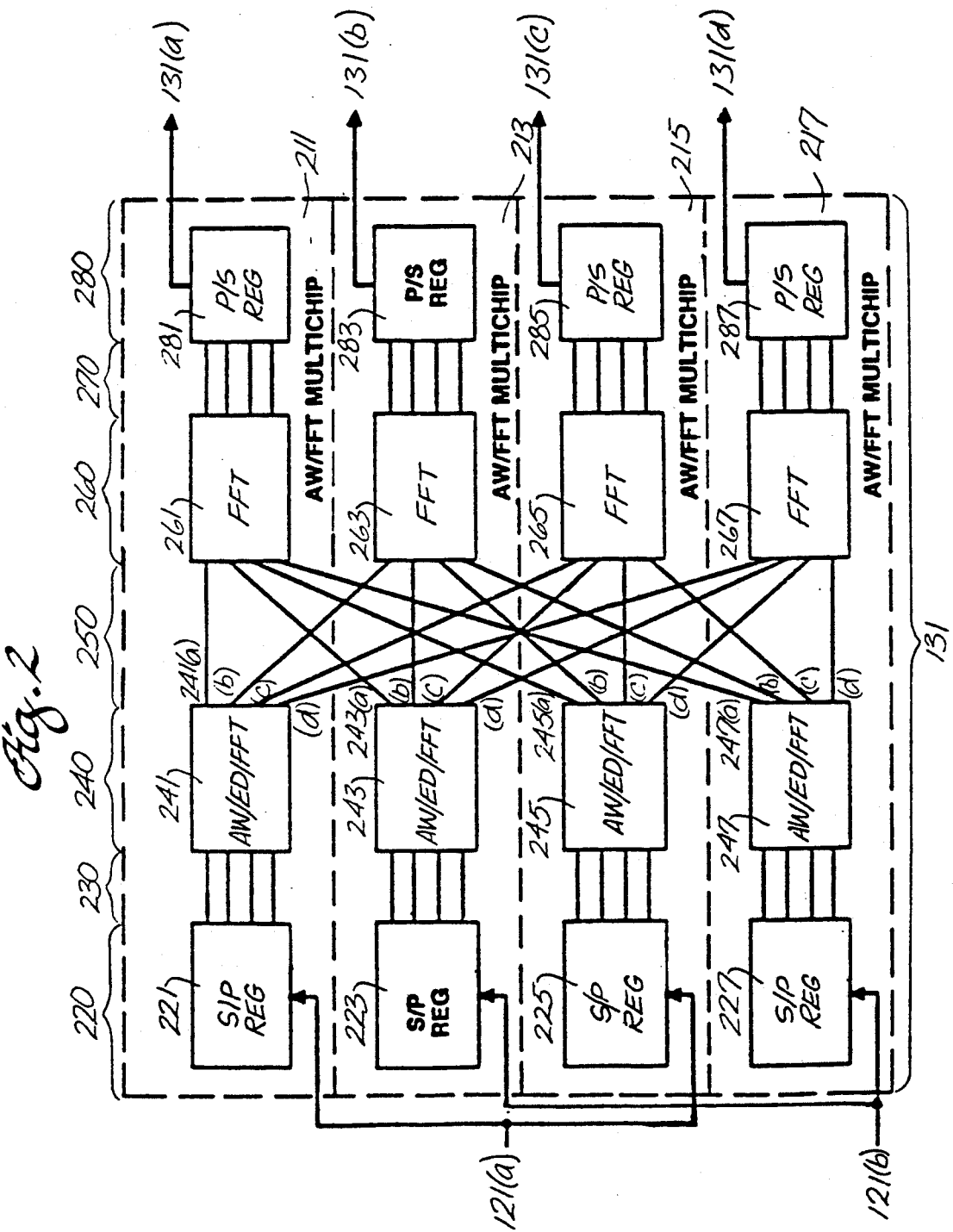

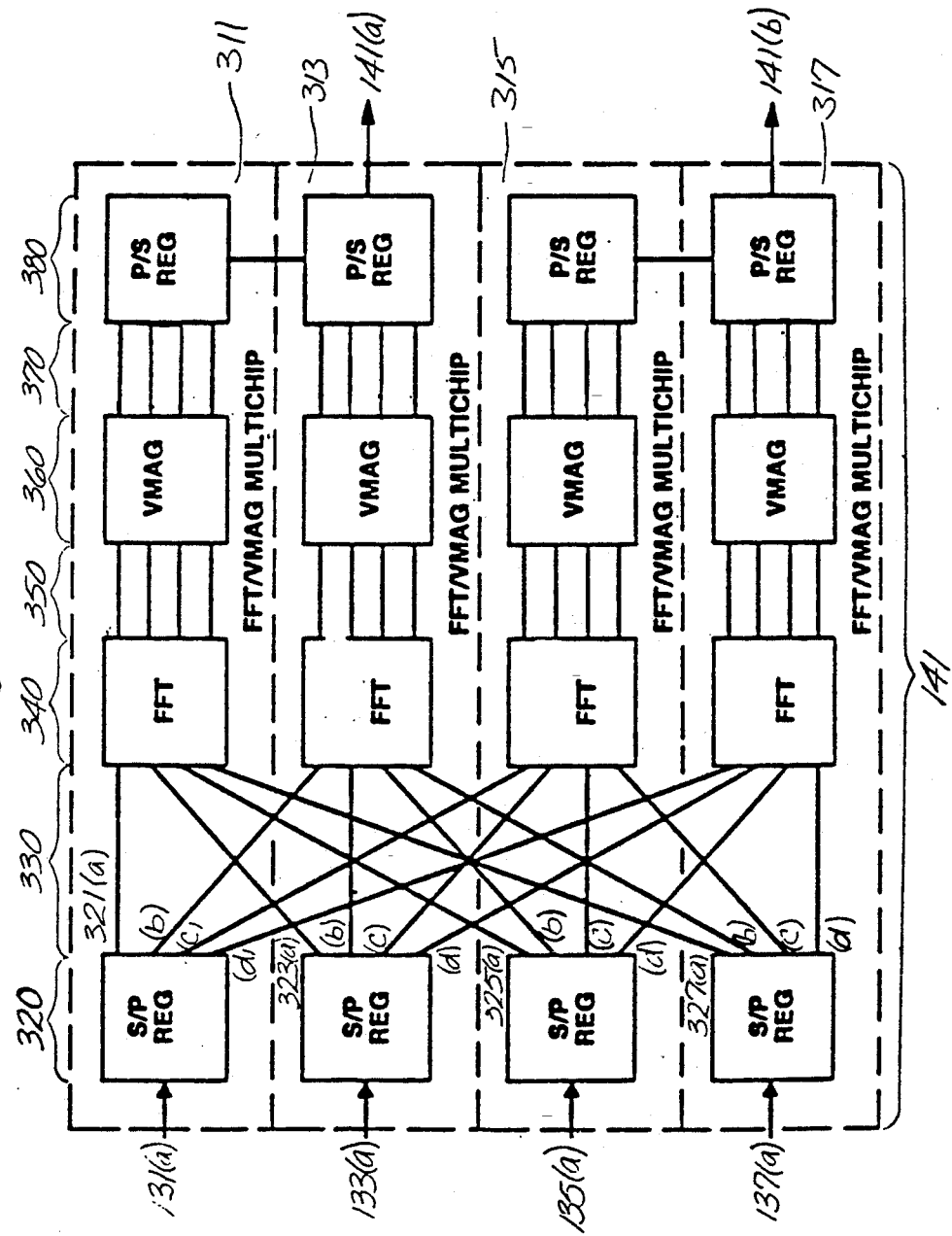

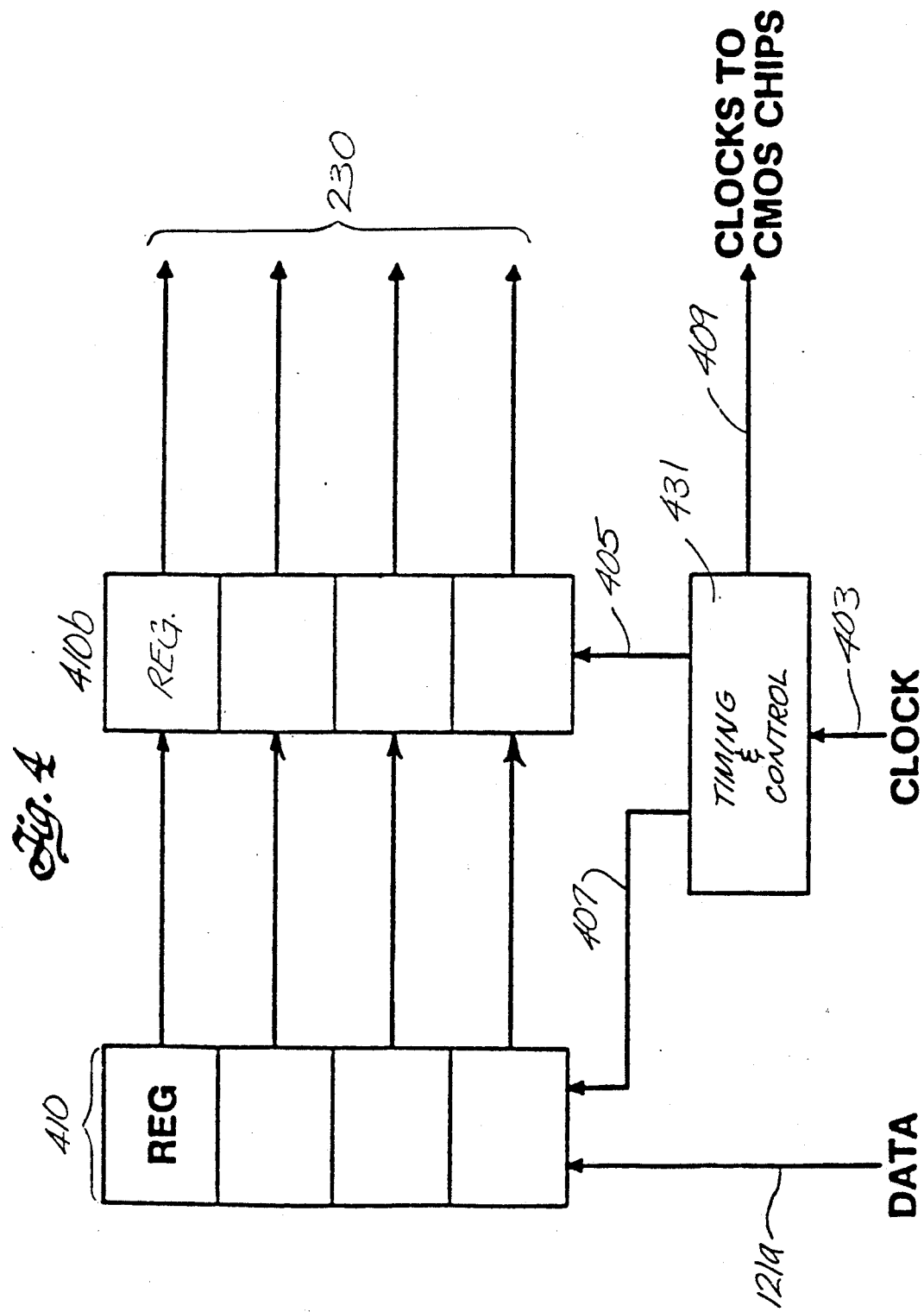

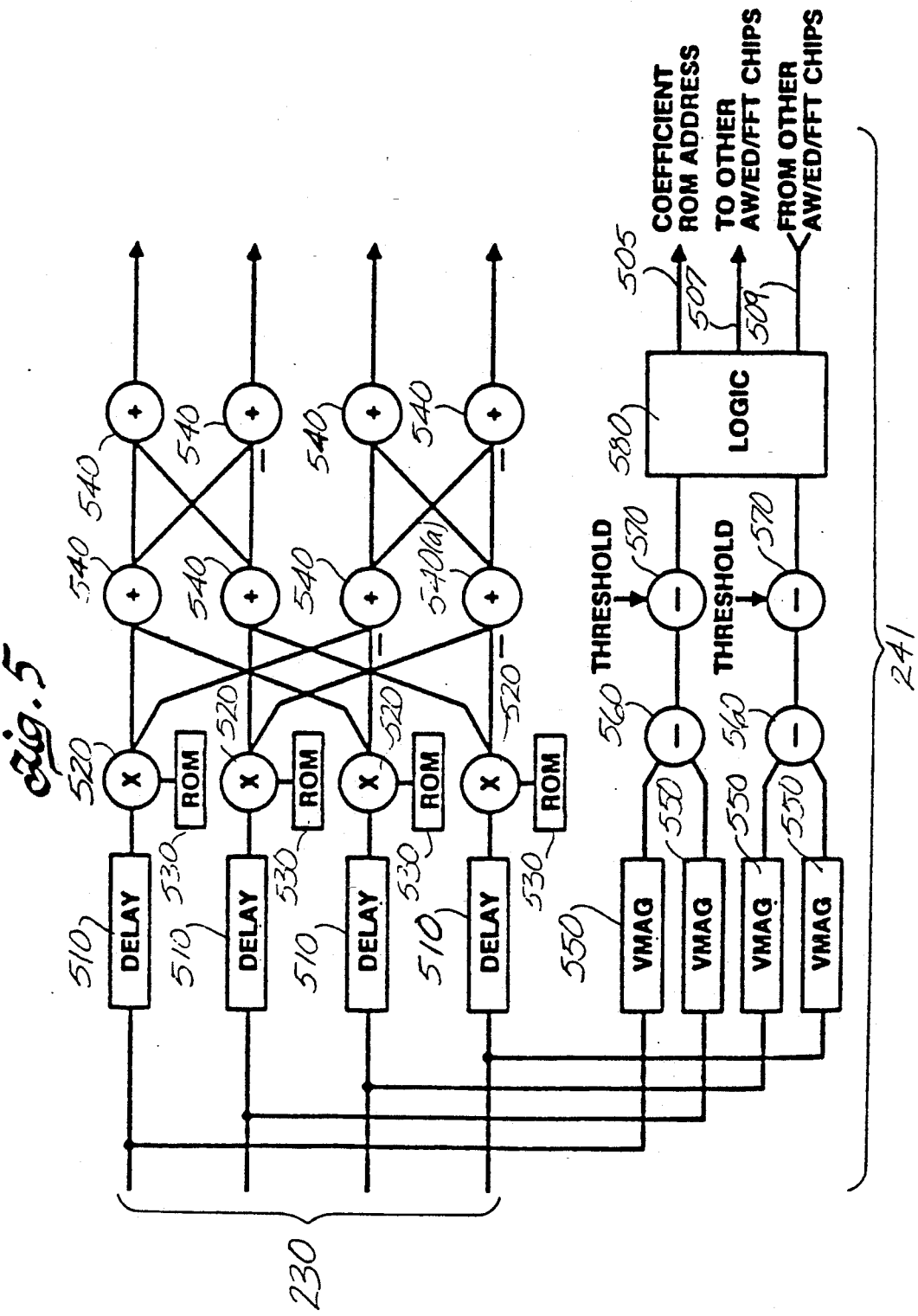

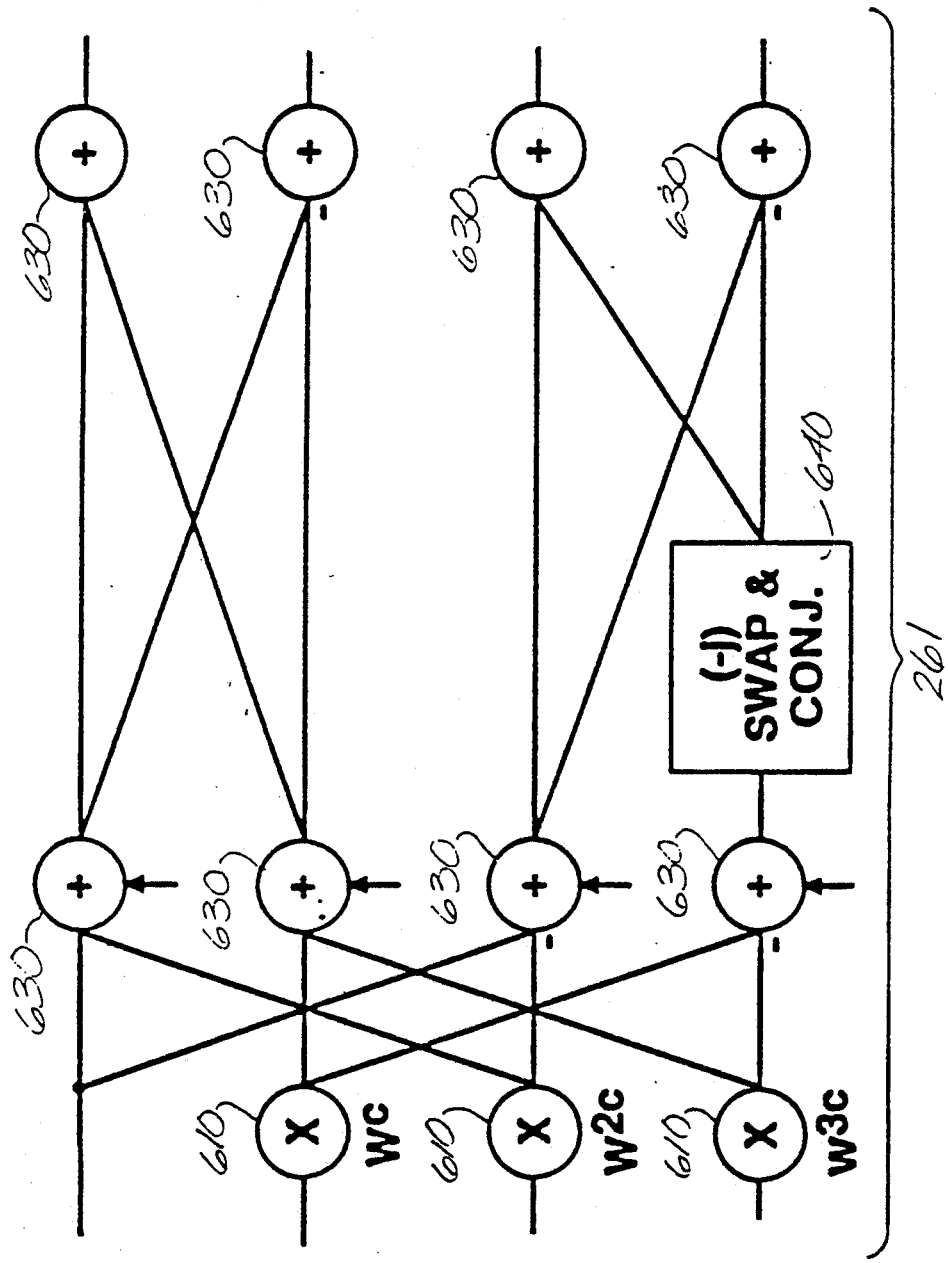

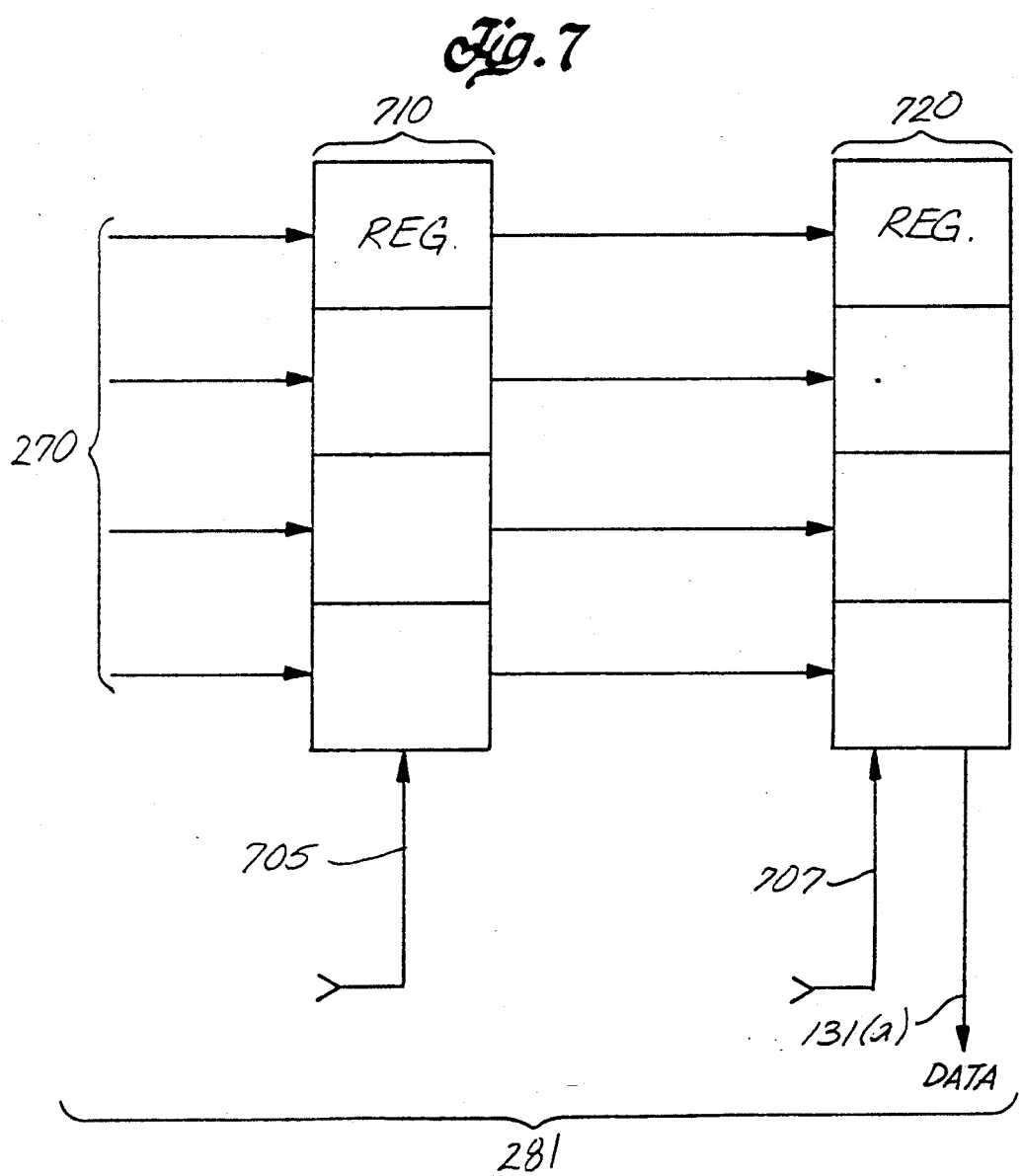

SYSTOLIC FFT ENGINE WITH INTERMEDIATE HIGH SPEED SERIAL INPUT/OUTPUT

FIELD OF THE INVENTION

This invention relates to a fast Fourier transform (FFT) algorithm implementation suitable for military environments, and more particularly, to a multi-module FFT implementation providing parallel data processing within each module and serial transmission of data between modules.

BACKGROUND OF THE INVENTION

A discrete Fourier transform (DFT) is an algorithm that performs a Fourier transform on discrete time samples of a time varying function. The fast Fourier transform (FFT) is a generic name given to a family of highly specialized computation algorithms which greatly reduce the time required to compute a DFT.

The DFT algorithm is accomplished generally by multiplying each discrete input sample from a time varying function by a number of filter coefficients. By using a FFT algorithm, certain mathematical symmetries in the DFT algorithm are taken advantage of to maximize the efficiency of the calculation. As a result, an FFT computation can be broken down into a number of successively smaller FFTs. For example, a 64-point FFT can be implemented with a first FFT pass consisting of four 16 point FFTs followed by a second FFT pass of sixteen 4-point FFTs. Each FFT pass in turn represents a number of complex computations generally referred to as "butterflies" or "butterfly computations".

Since the FFT is merely a sequence of complex multiplications and complex additions, it can be accomplished with many different algorithms. Accordingly, the FFT has been implemented with a variety of hardware and software mechanisms. Software intensive implementations have only one computational element to which all input samples and intermediate sums must be sequentially routed. Hardware intensive implementations usually have at least one computational element dedicated to each FFT pass to allow for some level of parallel computation. Some implementations may even have a computational element for each butterfly computation that is required within an individual FFT pass. The resulting implementation depends primarily on the environment in which the FFT will operate. Military applications generally require a compact high speed FFT which operates with low power and low latency.

Satisfaction of these requirements has classically been attempted with several techniques. One method of calculating FFTs at high speed rates is to build the FFT in a pipeline architecture. A pipeline architecture provides one computational element for each pass of the FFT. This will increase the speed of the computation by allowing a small degree of parallel processing. Parallel processing occurs when more than one set of data samples are operated on at the same time. In a pipeline structure, as the first set of samples moves on to the second FFT pass, the next set of samples is being processed in the first FFT pass. However, within each pass, each group of samples must be processed sequentially by the single computational element present in that FFT pass. The pipeline architecture has an advantage over the single computational element design in that it does not require the use of memory elements to store intermediate results. Also, latency is reduced since more than one computational element is used.

Even though latency is improved with a pipeline architecture, emitter coupled logic (ECL) or gallium arsenide (GaAs) circuits must be used to incorporate high speed applications. The resulting configuration is typically not adequate for military applications. First, since available ECL and GaAs devices are low density components, the volume required by such an implementation is often excessive. Second, the design and use of custom ECL and GaAs devices are often prohibitively expensive due to the custom high speed test fixtures that must be developed to test the FFT. Third, ECL and GaAs circuits consume a relatively large amount of power.

Another method of performing FFT calculations is through "super parallelism". In a super parallel architecture, a computational element is available for each butterfly computation that is required by the algorithm. This architecture allows all of the computations within a FFT pass to be done simultaneously rather than sequentially as in a pipeline architecture. It also allows more than one set of data samples to be operated on at the same time as in the pipeline example. This method significantly reduces the computation time (latency) of the FFT. In fact, the speed may be increased so much that a slower technology such as complementary metal-oxide-silicon (CMOS) can be used to implement the algorithm. CMOS has two additional advantages: it is more compact, and it consumes less power than either ECL or GaAs.

The disadvantage of a super parallel FFT is the vast number of interconnections needed to link the computation elements together. This problem is magnified when the FFT cannot be implemented on a single module. In a multi-module design, wires and connectors must be used to link the modules together. When a large number of inter-connections must be made, the reliability of the design is severely reduced. This problem is subdued in single module designs where the butterfly connections are made within a substrate. Even though CMOS is a high density technology, the super parallel architecture makes single module design prohibitive in many military applications.

Each of the prior art implementations described attempt to increase the computational speed of the FFT. With each, latency is reduced at the cost of certain tradeoffs which make high speed FFT computation in military systems nearly impossible.

SUMMARY OF THE INVENTION

The present invention provides for a parallel processing FFT architecture in which butterfly passes within the FFT are implemented in modules and the input/output between passes separated by module boundaries is performed serially at high speed. This architecture eliminates many of the problems inherent in the prior art. The volume that parallel architectures usually require is reduced by implementing the butterfly computations with high density CMOS circuitry. The interface density is further reduced by placing intermediate registers in between passes of the FFT. Data is transmitted over a split serial data path. In order to maintain a constant data flow through the parallel and serial portions of the circuit, the serial data is transmitted at a higher clock rate than that at which the computations are made. This high speed interface significantly reduces the number of interconnects between modules without reducing the performance of the system. Further, since most of the circuitry is implemented in CMOS, the FFT consumes less power than an all ECL machine.

BRIEF DESCRIPTION OF THE DRAWINGS

These and other features and advantages of the present invention will be better understood by reference to the following detailed description when considered in conjunction with the accompanying drawings wherein:

FIG. 1 shows a simplified block diagram of the first embodiment of the present invention;

FIG. 2 shows a block diagram of the AW/ED/FFT half module;

FIG. 3 shows a block diagram of the FFT half module;

FIG. 4 shows a block diagram of the serial parallel register chip;

FIG. 5 shows a block diagram of the AW/ED/FFT chip;

FIG. 6 shows a block diagram of the FFT chip; and

FIG. 7 shows a block diagram of the parallel to serial register chip.

DETAILED DESCRIPTION

Referring to FIG. 1, a first embodiment of the invention is demonstrated in block diagram form. This embodiment implements a 64-point fast Fourier transform (FFT) function with a 1.28 gigahertz bandwidth. The system uses analog to digital converters (A/Ds) 120 and a specialized hardware implemented 64-point FFT 105. The 64-point FFT architecture is a radix 4 design which is comprised of four 16-point FFTs 130 and sixteen 4 point FFTs 140. The four 16-point FFTs 130 are implemented in four identical AW/ED/FFT half modules 131, 133, 135, 137. The sixteen 4-point FFT modules 140 are implemented in four identical FFT/VMAG half modules 141, 143, 145, and 147. These eight half modules are partitioned onto four separate double-sided modules 111, 113, 115, and 117 such that each module consists of one AW/ED/FFT half module and one FFT/VMAG half module. As a representative example, AW/ED/FFT half module 131 occupies one side of module 111, and FFT/VMAG half module 141 occupies the opposite side of the same module. Data is transmitted from the AW/ED/FFT half modules to the FFT/VMAG half modules via a split serial data bus structure 150. The split serial data bus structure is composed of sixteen mini-busses 131 (a, b, c, d), 133 (a, b, c, d), 135 (a, b, c, d), and 137 (a, b, c, d). In order to implement the composite 64 point FFT, each of the AW/ED/FFT half modules must be connected to each of the FFT/VMAG half modules. Accordingly, some of the mini-busses 150 must cross from one side to the other side of the same module (crossovers). Further, some of the mini-busses 150 must travel from one module to a different module (input/output). The split serial bus structure is used to reduce the number of crossover and input/output signals that are needed to create the composite FFT. For example, in this particular embodiment, if the split serial data structure were not used and each of the sixty-four 28 bit data words produced by the four 16-point FFTs 130 were transmitted over their own 28-bit wide bus, 1,792 separate wires would have to be connected between half modules either as crossovers or input/output. The split serial bus reduces this number by a factor of four to 448.

The basic data flow through the system can be demonstrated with reference to FIG. 1 in conjunction with FIG. 2 and FIG. 3. Four 320 megahertz A/Ds 121, 123, 125, and 127 are used to produce the analog to digital conversion of 64 data points at a 1.28 gigahertz rate. The A/Ds convert the data points from their analog representation at the input to a digital representation to be used by the 64 point FFT calculation. The resulting digital word representing each data point is 20-bits wide. This 20-bit word in turn represents a 10-bit in-phase (I) component and a 10-bit quadrature (Q) component. Each of the A/Ds process 16 of the 64 data points in a staggered order. Thus A/D 121 converts every fourth data point starting with data point 0 (i.e., data points 0, 4, 8, 12 . . . 60). A/D 123 converts every fourth data point starting with data point 1, A/D 125 converts every fourth data point starting with data point 2, and A/D 127 converts every fourth data point starting with data point 3.

The outputs of each A/D are further staggered onto eight separate buses. For example, half of the data points that A/D 121 converted will appear on bus 121a, and the other half will appear on bus 121b. Specifically, bus 121a will transmit every second data point that A/D 121 converted (0, 8, 16, 24, 32, 40, 48, and 56). (Bus 121b will transmit data points 4, 12, 20, 28, 36, 44, 52, and 60.) This process results in the 64 data points being distributed across the 8 split serial data buses 160.

Referring to FIG. 2, a block diagram of a representative AW/ED/FFT half module 131 is shown. This half module contains four ECL serial to parallel register chips 220, four CMOS 4-point FFT chips with amplitude weighting and edge detect (AW/ED/FFT chips) 240, four CMOS 4 point FFT chips (FFT chips) 260, and four ECL parallel to serial register chips 280. The sixteen CMOS and ECL chips are partitioned onto four identical multichip substrates 211, 213, 215, and 217 so that each multichip substrate houses one of each type of chip described above. For example, multichip substrate 211 houses serial to parallel register chip 221, AW/ED/FFT chip 241, FFT chip 261 and parallel to serial register chip 281.

The data points resident on data bus 121a are split between serial to parallel register chip 221 and serial to parallel register chip 225 such that data points 0, 16, 32, and 48 are loaded into chip 221, and data points 8, 24, 40, and 56 are loaded into chip 225. The data points resident on data bus 121b are similarly loaded into serial to parallel register chip 223 and serial to parallel register chip 227. The staggering of data points onto the split serial data buses 160 and then into the receiving serial to parallel registers in the AW/ED/FFT half modules 130, aligns the input data to properly take advantage of the symmetry of the FFT approach. Each set of these 20-bit wide data points are serially loaded into the serial to parallel registers 220 at a clock rate of 80 megahertz. The data is output on 20-bit wide buses 230 at a clock rate of 20 megahertz.

The 64 data points are next applied to the inputs of the 16-point FFT function. The 16 point FFT calculation within the half module is implemented with four identical AW/ED/FFT chips 241, 243, 245, and 247, four identical FFT chips 261, 263, 265, and 267, and sixteen fully parallel 24-bit data buses 241 (a, b, c, d), 243 (a, b, c, d), 245 (a, b, c, d) and 247 (a, b, c, d).

Each of the AW/ED/FFT chips 240 perform edge detection, amplitude weighting, and a 4-point FFT on four of the sampled data points. The purpose of edge detection is to determine if there is a large step in the input signal. By properly selecting the amplitude weights, the energy splatter across the FFT filters caused by such an input can be suppressed. This function is required for channelizer applications since the origination and strength of the input signal is unknown. Once the appropriate amplitude weights have been applied to the input signals, a radix 4 butterfly is performed on the chip inputs. The result of this first FFT pass is transmitted to the second FFT pass via sixteen 24-bit wide data buses. The word size is increased from 20 to 24 bits as a result of the complex multiplications associated with the FFT butterfly computation. The second set of radix 4 butterflies are performed by the FFT chips 260. The parallel outputs 270 are then converted into split serial data using the parallel to serial register chips 280. The parallel data is loaded into the registers 280 at a clock rate of 20 megahertz. The split serial data is transmitted at a 80 megahertz clock rate over the split serial data bus structure 150. Each of the four output buses from AW/ED/FFT half module 131 is transmitted to a different module. Bus 131a, which is resident on module 111, is transmitted to the opposite side of module 111; bus 131b is transmitted to module 113; bus 131c is transmitted to module 115; and bus 131d is transmitted to module 117. This data is received into the FFT/VMAG half modules located on each of these modules.

Referring to FIG. 3, a block diagram of a representative 4×4 point FFT half module 141 is shown. This half module consists of four ECL serial to parallel register chips 320, four CMOS FFT chips 340, four CMOS vector magnitude (VMAG) chips 360, and four ECL parallel to serial register chips 380. The sixteen ECL and CMOS chips in the FFT/VMAG half module are partitioned onto four identical FFT/VMAG multichip substrates 311, 313, 315, and 317 so that each multichip substrate contains one of each type of chip described above.

The FFT/VMAG half module 141 receives data from each of the AW/ED/FFT half modules 130 over four split serial data buses 131a, 133a, 135a, and 137a. Each of these buses operates at 80 megahertz and each set of four data points are serially loaded into the serial to parallel registers 320. This data is output on sixteen 28-bit wide data buses 321(a, b, c, d), 323(a, b, c, d), 325(a, b, c, d), and 327(a, b, c, d) at a clock rate of 20 megahertz. The sixteen data points represented within each half module are then applied to four FFT chips 340. These chips are identical to the FFT chips implemented in the AW/ED/FFT half modules. This last 4-point FFT pass completes the computation of the composite 64 point FFT.

Each of the resulting 64 data points (only one quarter of them are shown in FIG. 3) represent I & Q data for one of the 64 filters that make up the FFT filter bank. The outputs of the FFT chips 340 are transmitted to the VMAG chips via parallel 28-bit wide data buses 350. The VMAG chips 360 extract magnitude data from the FFT results by taking the vector sum, $\sqrt{I^2+Q^2}$, of the input of each VMAG chip. To save computing time, the vector sum is approximated using a common mathematical equation. The absolute value of the larger of I and Q is added to half the absolute value of the lesser of I and Q. The output of the VMAG chips are 16-bit wide data words 370. This data is transmitted via 16-bit wide data buses and is loaded into the parallel to serial registers 380 at a clock rate of 20 megahertz. Each group of 8 data words are serially output on a split serial data bus 141a and 141b at a clock rate of 160 megahertz.

Referring to FIG. 4, a block diagram of a representative serial to parallel register chip 221 is shown. Although the reference numbers shown are aligned with serial-to-parallel register chip 221, all of the serial-to-parallel register chips implemented in this embodiment operate in the same manner, regardless of the width of the data buses. The input to the circuit is a 20-bit wide data bus 121a. Four words of 20 bit data on each of the 20 data lines are serially loaded into register 410 at a clock rate of 80 megahertz. Then the four data words are clocked into register 410b and the data is output on four 20-bit wide data buses 230. This parallel output data is updated at a rate of 20 megahertz. The 80 megahertz reference clock 403 is the input to the timing and control logic 431. The output of the timing and control logic is an 80 megahertz clock 407, a 20 megahertz clock 405, and CMOS chip clocks 409. The CMOS chip clocks are used by the delay function in the AW/ED/FFT chips.

Referring to FIG. 5, a block diagram of AW/ED/FFT chip 241 is shown. This chip implements a radix four, 4-point FFT along with amplitude weighting and edge detection. Edge detection is accomplished with vector magnitude logic 550, adders 560 and 570, and decision logic 580 which takes into account the results of other local edge detectors in companion AW/ED/FFT chips and the position of each particular AW/ED/FFT chip 241 in the system 105, which determines the input samples that the chip is operating on. Each chip outputs two bits of data 507 and receives two bits of data from each of the other AW/ED/FFT chips. Additionally, each chip supplies address 505 for the coefficient ROM 530.

The edge detection consists of taking a vector magnitude of the input data using the VMAG 550 resources and then calculating the magnitude of the difference between the vector magnitude of successive samples by using adders 560 and comparing the result to a threshold via adders 570. The logic 580 receives two bits of data from adders 570 that are on the same AW/ED/FFT chip 241 and also two bits of input data 509 from each logic 580 on the other AW/ED/FFT chips 243, 245, and 247. The logic 580 simultaneously outputs the two bits of data from adder 570 to the other AW/ED/FFT chips 243, 245, and 247 via output 507. This same operation is repeated in similar fashion at all the AW/ED/FFT chips. The logic block 580 then has the data to determine if there is a step function or amplitude edge in and input data and, if so, how to set the amplitude weights to dampen the spectral impact of the step function. This knowledge of the step function together with the position of the particular AW/ED/FFT chip in the subsystem 240, is used to select the proper coefficient ROM address 505, which is sent to ROMs 530. The coefficients looked up in the ROMs 530 are then applied to multipliers 520 to amplitude weight the data.

The radix four, 4-point FFT butterfly is implemented with eight complex adders 540. No multiplies are needed for the butterfly calculation since the coefficient of the first FFT pass is unity; however, following complex adder 540a, a multiply by [(−j)] is required, which can be implemented by complementing the inphase component and then swapping the resulting inphase and quadrature components. Each of the input samples 230 are subject to delay circuitry 510 and amplitude weight multipliers 520 before they reach the butterfly circuitry. The delay allows the edge detection and amplitude weight logic to arrive at a proper coefficient ROM address 505 before the input samples are multiplied by the amplitude weights. Eight 12×16 bit multipliers 520 are used to perform the amplitude weighting.

A block diagram of 4-point FFT chip 261 is shown in FIG. 6. The radix four 4-point FFT butterfly is implemented with three complex multipliers 610, eight complex adders 630 and conjugation circuit 640. The multiplier coefficients are determined by the placement of the 4-point FFT chip within the composite FFT array of FFT chips.

Referring to FIG. 7, a block diagram of a representative parallel-to-serial register chip is shown. Although the reference numbers shown relate to parallel-to-serial register chip 281, all of the parallel-to-serial register chips implemented in this embodiment operate in the same manner regardless of the width of the parallel databases. Four 28-bit wide buses of parallel data are loaded into registers 710 at a 20 megahertz rate via a 20 megahertz clock 705 connected to each of the registers and then loaded into register 720. This data is output serially on one 28-bit wide data bus 131a at a clock rate of 80 megahertz. An 80 megahertz clock 707 is coupled to the output register 720 in order to mechanize this function.

Having now described the invention in detail, as required by the patent statute, those skilled in the art will recognize modifications and alterations to the embodiment shown for specific applications or requirements. Such modifications or alterations are within the scope and intent of the invention as defined in the following claims.

What is claimed is:

1. A system for calculating a composite fast Fourier transform of a discrete time varying input signal by aggregating individual FFT passes comprising:
    a first plurality of modules having inputs and outputs, each module having first means for calculating FFT butterflies, second means coupled to the first calculation means for serially receiving the inputs of each module, and third means coupled to the first calculation means for serially transmitting data to the outputs of each module, the first plurality of modules being parallelly arranged to provide an architecture for computing a first FFT pass on the discrete time varying input signal;
    a second plurality of modules having inputs and outputs, each module having fourth means for calculating FFT butterflies, fifth means coupled to the fourth calculation means for serially receiving the inputs of each module, and sixth means coupled to the fourth calculation means for serially transmitting data to the outputs of each module, the inputs of the second plurality of modules being connected to the outputs of the first plurality of modules and the second plurality of modules being parallelly arranged to provide an architecture for computing a second FFT pass of the composite FFT;
    a first clock coupled to the first and fourth calculation means; and
    a second clock coupled to the second and fifth reception means and to the third and sixth transmission means, the second clock having a frequency higher than the frequency of the first clock.

2. A system for calculating a composite fast Fourier transform (FFT) of a discrete time varying input signal comprising:
    a plurality of first modules having inputs and outputs, each module having a plurality of multichip substrates, a first plurality of serial-to-parallel register chips, a plurality of first FFT chips, a first plurality of second FFT chips, and a plurality of first parallel-to-serial register chips mounted therein, each multichip substrate having electrically mounted on said multichip one first serial-to-parallel register chip for receiving the module inputs, one first FFT chip for detecting transients in any applying weights to the discrete time varying input signal and for performing an FFT butterfly, one second FFT chip for performing an FFT butterfly, and one first parallel-to-serial register chip for transmitting the module outputs to each of the first serial-to-parallel register chips being coupled to the module inputs, each of the first FFT chips being coupled to the first serial-to-parallel chips resident on a common multichip substrate of said chips, each of the second FFT chips being coupled to each of the first FFT chips, each of the first parallel-to-serial register chips being coupled to the module outputs and to the second FFT chip resident on a common multichip substrate of said chips;
    a plurality of second modules having a second plurality of multichip substrates, a plurality of second serial-to-parallel register chips, a second plurality of second FFT chips, a plurality of vector magnitude chips, and a plurality of second parallel-to-serial register chips mounted therein, each multichip substrate having electrically mounted on said multichip one second serial-to-parallel register chip for receiving the module inputs, one second FFT chip for performing an FFT butterfly computation, one vector magnitude chip for calculating the vector magnitude of each composite FFT filter, and one second parallel-to-serial register chip for transmitting the module outputs, each of the second serial-to-parallel register chips being coupled to the module inputs, each of the second FFT chips being coupled to each of the second serial-to-parallel register chips, each of the vector magnitude chips being coupled to the second FFT chips on a common multichip substrate of said chips, each of the second parallel-to-serial register chips being coupled to the module outputs and to the vector magnitude chip resident on a common multichip substrate of said chips, each of the second modules being coupled to each of the first modules;
    a first clock coupled to the first and second FFT chips, the first and second serial-to-parallel register chips and the first and second parallel-to-serial register chips; and
    a second clock coupled to the plurality of first and second serial-to-parallel register chips and to the plurality of first and second parallel-to-serial register chips, the second clock having a frequency higher than the first clock frequency.

3. A system for calculating a composite Fast Fourier Transform of a discrete time varying input signal comprising;
    a first plurality of parallel modules, each module containing means for calculating one butterfly pass of an FFT;
    a first plurality of register means intermediate the output of the first plurality of modules and the serial interconnection means, the first plurality of register means for receiving the output from the first plurality of modules and converting that output from parallel to serial data;

a second plurality of modules of the same number of said first plurality of modules and each module containing means for calculating one butterfly pass of an FFT;

a second plurality of register means intermediate the serial interconnection means and the input of the second plurality of modules, the second plurality of register means for receiving data from the serial interconnection means for conversion from serial to parallel format and distribution of the data to each of the inputs of the second plurality of modules;

serial interconnection means for connecting the output of each of the first plurality of modules to the input of each of the second plurality of modules wherein the serial interconnection means operates at a higher clock rate than the modules and register means, whereby data flow through the parallel modules and serial interconnection means is constant and;

input means for providing an input signal to each of the first plurality of modules and output means for receiving the output of each of the second plurality of modules.

4. A system for calculating a composite Fast Fourier Transform as defined in claim 3 wherein the input means includes a third plurality of input circuits identical in number to the first plurality, each input circuit having means for amplitude weighting the input signal and means for edge detect of the input signal.

5. A system for calculating a composite Fast Fourier Transform as defined in claim 4 wherein the edge detection means comprises means for taking a vector magnitude of the input signal and means for calculating a difference between the vector magnitude of successive samples.

6. A system for calculating a composite Fast Fourier Transform as defined in claim 5 wherein the amplitude weighting means is responsive to the edge detection means in each of the third plurality of input circuits.

7. A system for calculating a composite Fast Fourier Transform as defined in claim 5 wherein the input means further comprises delay means for delaying the data input to the FFT during operation of the vector magnitude calculation means.

8. A system for calculating a composite Fast Fourier Transform as disclosed in claim 3 wherein the output means includes a fourth plurality of second vector magnitude calculating means, said fourth plurality equal in number to the first plurality, said second vector magnitude calculating means for calculating the vector magnitude of the output of an associated module of the second plurality of modules whereby the magnitude of the result of the Fast Fourier Transform is output.

* * * * *